July 7, 1931.   P. J. YOUNG   1,813,651
SOIL PULVERIZING MACHINE
Filed March 14, 1929   2 Sheets-Sheet 1
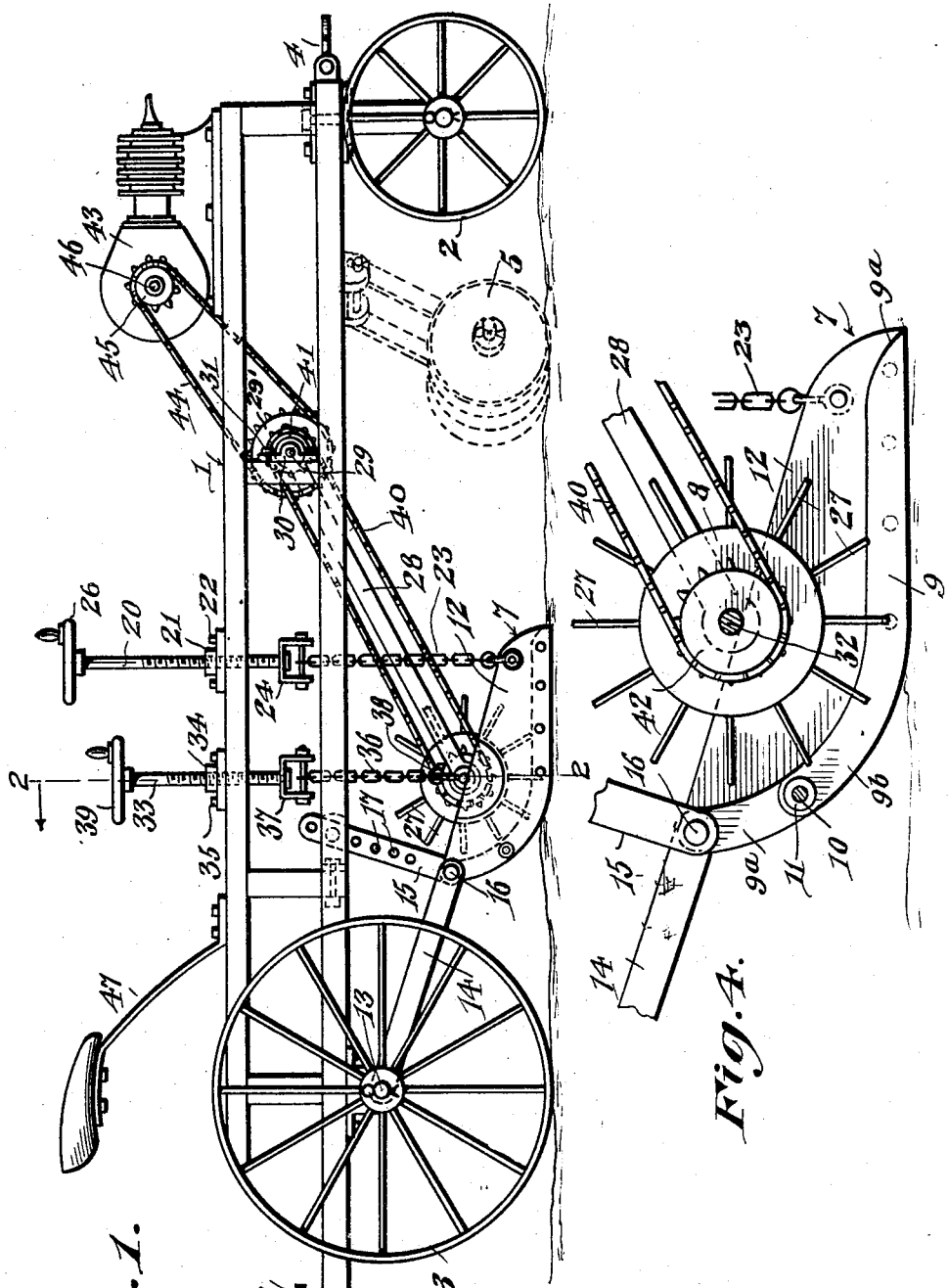
INVENTOR.
Porus J. Young,
BY
Irving L. McCathran
ATTORNEYS.

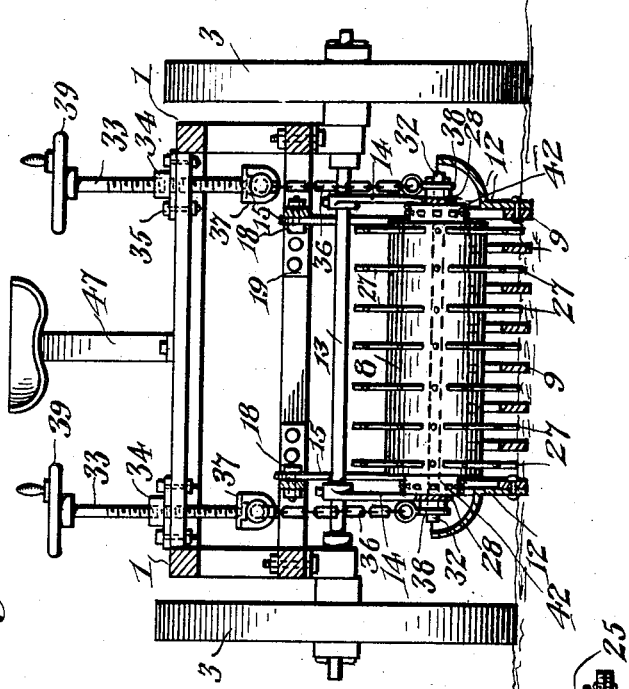
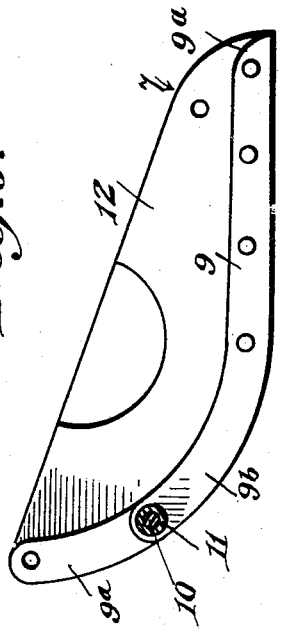
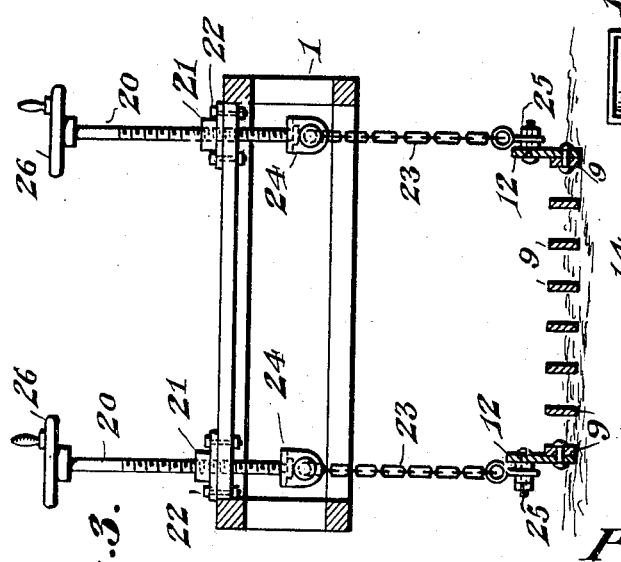
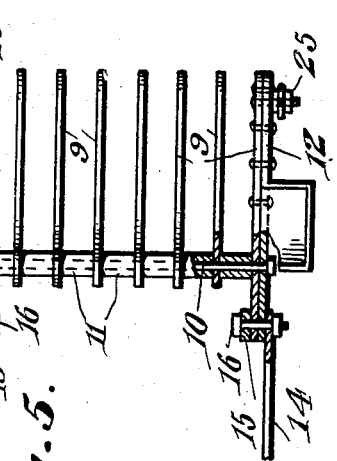

Patented July 7, 1931

1,813,651

UNITED STATES PATENT OFFICE

PORUS J. YOUNG, OF CHARLESTON, WEST VIRGINIA

SOIL PULVERIZING MACHINE

Application filed March 14, 1929. Serial No. 347,123.

This invention relates to soil pulverizers, and has for one of its objects to provide a machine of this character which shall be adapted to pulverize the turned up soil of a plowed field to a depth equal to that of the plowing, to the end that the field will be entirely free from clods and in the best possible condition for the reception of seed and the vigorous growth of crops.

The invention has for a further object to provide a machine of the character stated which shall embody a slotted scoop or gatherer adapted to pass beneath the turned up soil at a depth equal to the depth of plowing, the soil being elevated as it passes through the scoop or gatherer, and means associated with the scoop or gatherer for pulverizing the soil as it passes therethrough.

The invention has for a further object to provide a machine of the character stated which shall embody a scoop or gatherer of the character stated, and a spiked drum associated with the scoop or gatherer for pulverizing the soil as it passes therethrough.

The invention has for a further object to provide a machine of the character stated wherein the scoop or gatherer and the pulverizing means shall be supported for adjustment in a manner to adapt the machine for use in fields plowed to different depths.

The invention has for a further object to provide a machine of the character stated wherein the scoop or gatherer shall be detachable so that when conditions permit the spiked drum may be used alone to effect the pulverization of the soil.

The invention has for a still further object to provide a machine of the character stated which shall be adapted to be used in connection with a gang plow and a seed drill or in connection with either of such machines so as to permit the field to be plowed, pulverized and seeded, or plowed and pulverized, or pulverized and seeded in one operation.

With the foregoing and other objects in view, the nature of which will appear as the description proceeds, the invention consists in the construction, combination and arrangements of parts hereinafter fully described and claimed, and illustrated in the accompanying drawings, wherein:

Figure 1 is a view in side elevation of a soil pulverizing machine constructed in accordance with my invention;

Figure 2 is a sectional view taken on the vertical plane indicated by the line 2—2 of Figure 1;

Figure 3 is a transverse section illustrating the adjusting means for the forward end of the scoop only.

Figure 4 is a sectional view on an enlarged scale taken on a plane extending vertically and longitudinally through the scoop or gatherer and the spiked drum.

Figure 5 is a view partly in top plan and partly in horizontal section of the scoop, and Figure 6 is a view taken on a plane extending vertically and longitudinally through the scoop.

The machine comprises a frame 1 which is supported by front wheels 2 and rear wheels 3. The machine may be propelled over the field by a tractor, and to permit of its being connected to the tractor a clevis 4 is secured to the front end of the frame 1. The machine may be equipped with a gang plow 5, as shown in dotted lines in Figure 1. The plow may be of the disc or any other type, and when used will be connected to the frame 1 forwardly of the pulverizing means. The machine may also be equipped with a seed drill, not shown. To permit a seed drill to be connected to the machine rearwardly of the pulverizing means, the frame 1 is provided at its rear end with a coupling pin 6.

The pulverizing means comprises a scoop or gatherer 7 and a toothed drum 8. The scoop or gatherer 7 consists of bars 9 provided with pointed front ends 9a and with upwardly curved rear end portions 9b. The bars 9 are arranged in relatively spaced relation to permit the pulverized soil to pass between them, and they are secured together and in spaced relation by rods 10 and collars 11. The scoop or gatherer 7 has sides 12 which gradually decrease in vertical extent from their rear to their front ends and are secured to the outermost of the bars 9. The rear end portions 9a of the outermost of the bars 9 extend above the corresponding end portions of the remaining bars to provide a substantial support for the rear end portions of the sides 12.

The scoop or gatherer 7 is arranged forwardly of the rear axle 13, and is connected to said part by links 14 and to the frame 1 forwardly of the axle by links 15. The links 14 are pivotally connected to the axle 13, and are together with the links 15 pivotally connected by bolts 16 to the upper rear corners of the scoop or gatherer 7. The links 15 are each provided with a series of openings 17, and are connected by bolts 18 to brackets 19 carried by the frame 1.

The links 14 and 15 support the upper rear end of the scoop or gatherer 7 for rocking movement or adjustment about a horizontal axis extending transversely of the machine and coinciding with the pivots 16, so as to permit the front end of the scoop or gatherer to be raised or lowered to penetrate the ground at different depths. As the links 15 are each provided with the longitudinal series of openings 17, through an alined pair of which the bolts 18 pass, the pivots 16 of the scoop or gatherer 7 may be raised or lowered to assist in the adjustment of the front end of the scoop or gatherer. The means for raising and lowering the front end of the scoop or gatherer 7, and supporting it in adjusted position, comprises vertically arranged screw threaded rods 20 which pass through the nuts 21 secured as at 22 to the frame 1, and flexible links or chains 23 which are connected by swivels 24 to the lower ends of the screw rods and which are connected by pivots 25 to the front end of the scoop or gatherer. The screw rods 20 are provided at their upper ends with hand wheels 26 through the medium of which they may be readily turned to raise or lower the front end of the scoop or carrier 7.

The drum 8 extends transversely of the scoop or carrier 7, and is supported for rotation about a horizontal axis also extending transversely of the scoop or carrier. The teeth 27 of the drum 8 pass through the spaces between the scoop or carrier bars 9 during the rotation of the drum. Links 28 are pivotally connected to a shaft 29 which extends transversely of the frame 1 and is journaled in bearings 30 secured as at 31 to the frame. The shaft 29 is located forwardly beyond the scoop or carrier 7, and the links 28 extend downwardly and rearwardly from the shaft to the scoop or carrier. A shaft 32 upon which the drum 8 is mounted, is carried by the lower ends of the links 28. The drum 8 is supported for adjustment with and for adjustment with respect to the scoop or carrier 7 by means which comprises vertically arranged screw threaded rods 33 passing through the nuts 34 fixed, as at 35, to the frame, and flexible members or chains 36 connected by swivels 37 to the lower ends of the screw rods and connected by pivots 38 to the shaft 32. The screw rods 33 are provided at their upper ends with hand wheels 39 which permit them to be readily turned in raising and lowering the drum 8.

The drum 8 is driven from the shaft 29 by sprocket chains 40 which pass about sprocket wheels 41 fixed to said shaft and about sprocket wheels 42 fixed to the shaft 32. The shaft 29 is driven by an internal combustion engine 43 which may be of any suitable type and mounted upon the front end of the frame 1. A driving connection is established between the engine 43 and shaft 29 by a sprocket chain 44 which passes about the sprocket wheel 45 fixed to the crank shaft 46 of the engine 43 and about a sprocket wheel 29' fixed to the shaft 29.

The machine is provided with a seat 47 which is arranged in rear of and close to the hand wheels 26 and 39.

It should be apparent from the foregoing description, taken in connection with the accompanying drawings, that when the machine is in use the scoop or gatherer 7 will raise the entire turned up soil of the field, that the turned soil will pass through the scoop or gatherer, and that the clods will be pulverized by the action thereon of the toothed drum 8, the pulverized soil passing through the scoop or gatherer. The scoop or gatherer 7 and the toothed drum 8 pulverize the entire turned up soil, with the result that the field is in the best possible condition for the reception of seed and the vigorous growth of crops.

It will also be understood that the scoop or gatherer 7 may be easily and quickly adjusted through the medium of the screw rods 20 and 33 to adapt the machine for use in fields plowed to different depths, and that the scoop or carrier may be readily removed when it is desired to use the toothed drum 8 alone.

While I have described the principle of the invention, together with the structure which I now consider to be the best embodiment thereof, it is to be understood that the structure shown is merely illustrative, and that such changes may be made when desired as are within the scope of the invention as claimed.

What I claim is:

1. A soil pulverizer comprising a wheel supported frame, a gatherer, means for pivotally suspending the rear end of the gatherer from the frame, adjusting screws carried by the frame, flexible members connected to the adjusting screws and to the front end of the gatherer, a drum provided with peripheral teeth and associated with the gatherer, other adjusting screws carried by the frame, adjustable means connected to the drum and to said other adjusting screws, and means for operating the drum.

2. A soil pulverizer comprising a wheel supported frame, a gatherer, means for pivotally suspending the rear end of the gatherer from the frame, adjusting means carried by the frame, flexible members connected to the adjusting means and to the front end of the gatherer, a drum provided with peripheral teeth and associated with the gatherer, other adjusting means carried by the frame, flexible members connected to said other adjusting means and to the drum, and means for rotating the drum.

3. A soil pulverizing machine comprising a wheel supported frame, a gatherer, means for adjustably and pivotally suspending the rear end of the gatherer from the frame, means for adjustably suspending the front end of the gatherer from the frame, a drum provided with peripheral teeth, means for adjustably suspending the drum from the frame directly above the gatherer, and means for rotating the drum in its adjusted positions.

In testimony whereof I affix my signature.

PORUS J. YOUNG.